(12) United States Patent
Gupta et al.

(10) Patent No.: US 9,304,823 B2
(45) Date of Patent: Apr. 5, 2016

(54) METHOD AND APPARATUS FOR OPTIMIZING DOWNLOAD OPERATIONS

(75) Inventors: Saurabh Gupta, New Delhi (IN); Gaurav Singh, New Delhi (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 211 days.

(21) Appl. No.: 13/551,022

(22) Filed: Jul. 17, 2012

(65) Prior Publication Data

US 2014/0026140 A1 Jan. 23, 2014

(51) Int. Cl.
*G06F 9/50* (2006.01)
*H04L 29/08* (2006.01)
*G06F 11/00* (2006.01)
*H04L 12/26* (2006.01)

(52) U.S. Cl.
CPC .............. *G06F 9/5027* (2013.01); *G06F 11/00* (2013.01); *H04L 43/0888* (2013.01); *H04L 67/06* (2013.01); *G06F 2209/5011* (2013.01); *G06F 2209/5018* (2013.01)

(58) Field of Classification Search
CPC .................................................. G06F 9/5055
USPC ......................................................... 718/104
See application file for complete search history.

(56) References Cited

U.S. PATENT DOCUMENTS

| | | | |
|---|---|---|---|
| 5,668,951 A | 9/1997 | Jain et al. | |
| 6,934,740 B1 * | 8/2005 | Lawande et al. | 709/213 |
| 7,587,206 B2 | 9/2009 | Bi et al. | |
| 2002/0116518 A1 | 8/2002 | Silen et al. | |
| 2002/0138443 A1 * | 9/2002 | Schran et al. | 705/64 |
| 2003/0023745 A1 * | 1/2003 | Noe | 709/235 |
| 2006/0195507 A1 * | 8/2006 | Baek et al. | 709/203 |
| 2008/0071907 A1 * | 3/2008 | Thompson | 709/224 |
| 2008/0126539 A1 * | 5/2008 | Banerjee et al. | 709/224 |
| 2009/0244087 A1 * | 10/2009 | Okano | 345/589 |
| 2010/0115410 A1 * | 5/2010 | Fu et al. | 715/721 |
| 2010/0174772 A1 * | 7/2010 | Beck | 709/203 |
| 2010/0235323 A1 * | 9/2010 | Zhang et al. | 707/623 |
| 2010/0306373 A1 * | 12/2010 | Wormley | 709/224 |
| 2011/0082914 A1 | 4/2011 | Robert et al. | |
| 2011/0296046 A1 * | 12/2011 | Arya et al. | 709/231 |
| 2012/0151067 A1 * | 6/2012 | Piccinini et al. | 709/227 |
| 2012/0311134 A1 * | 12/2012 | Pantos et al. | 709/224 |
| 2013/0132556 A1 * | 5/2013 | DeLuca et al. | 709/224 |
| 2013/0167181 A1 * | 6/2013 | Dixit et al. | 725/95 |

(Continued)

OTHER PUBLICATIONS

George J. Lee, Lindsey Poole, Diagnosis of TCP Overlay Connection Failures using Bayesian Networks, SIGCOMM'06 Workshops Sep. 11-15, 2006, Pisa, Italy, p. 305-310.*

(Continued)

*Primary Examiner* — Emerson Puente
*Assistant Examiner* — Charlie Sun
(74) *Attorney, Agent, or Firm* — Keller Jolley Preece (57) ABSTRACT

A method and apparatus for optimizing downloading operations is disclosed. The method comprises determining a condition for a download speed for a plurality of threads for a file to a computer, wherein each thread is used to download a portion of the file; evaluating a plurality of environmental factors on the computer, wherein evaluating is only performed when the download speed meets a given condition; and performing one of increasing, decreasing, and not changing a number of threads used to perform the download depending on the evaluated plurality of environmental factors.

20 Claims, 5 Drawing Sheets

(56) References Cited

U.S. PATENT DOCUMENTS

2013/0275970 A1* 10/2013 Heim et al. .................. 718/1
2014/0006558 A1* 1/2014 Zhao et al. .................. 709/217

OTHER PUBLICATIONS

Tse-Yu Yeh and Yale N. Patt, Comparison of Dynamic Branch Predictors that use Two Levels of Branch History, ISCA '93 Proceedings of the 20th annual international symposium on computer architecture, 1993, IEEE, p. 257-266.*

Hand, David J.. Statistics: A Very Short Introduction. Oxford, GBR: Oxford University Press, 2008. ProQuest ebrary. Web. Aug. 5, 2015.*

Flavio Bonomi et al. , "Adaptive Algorithms for Feedback-Based Flow Control in High Speed, Wide Area ATM Networks", AT&T Platform Org., AT&T Network Systems, Red Bank, NJ 07701, AT&T Bell Laboratories, Murray Hill, NJ 07974, pp. 1-34.

* cited by examiner

METHOD AND APPARATUS FOR OPTIMIZING DOWNLOAD OPERATIONS

BACKGROUND OF THE INVENTION

1. Field of the Invention

Embodiments of the present invention generally relate to file downloading and, more particularly, to a method and apparatus for optimizing download operations.

2. Description of the Related Art

Users download various resources from the Internet in the form of files, such as software applications, application updates, multimedia content, documents and the like. HyperText Transfer Protocol (HTTP) is the underlying protocol used by the World Wide Web. HTTP defines how files are formatted and transmitted, and what actions servers and browsers should take in response to various commands. For example, when a user enters a Uniform Resource Locator (URL) in a browser, this sends an HTTP command to a web server directing the server to fetch and transmit the requested resource. While downloading the resource from the Internet, the user faces various challenges, such as packet losses, long waiting time, and the like.

Currently, techniques exist that utilize a download accelerator whose main aim is to attain the maximum download speed by spawning multiple download threads irrespective of environmental conditions on a user's computer. The conventional techniques may accelerate the download, but are unable to optimize downloading under all types of environmental conditions, be it low bandwidth, memory constraints, a faulty network, and the like.

Therefore, there is a need for a method and apparatus for optimizing download operations.

SUMMARY OF THE INVENTION

Embodiments of the invention generally relate to a method and apparatus for optimizing downloading operations. The method comprises determining a condition for a download speed for a plurality of threads for a file to a computer, wherein each thread is used to download a portion of the file. The method evaluates a plurality of environmental factors on the computer, wherein evaluating is only performed when the download speed meets a given condition. The method then performs one of increasing, decreasing, and not changing a number of threads used to perform the download depending on the evaluated plurality of environmental factors.

While the method and apparatus is described herein by way of example for several embodiments and illustrative drawings, those skilled in the art will recognize that the method and apparatus for optimizing download operations are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for optimizing download operations as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone.

DETAILED DESCRIPTION OF EMBODIMENTS

Embodiments of the present invention comprise a method and apparatus for optimizing download operations of any resource from the Internet through HyperText Transfer Protocol (HTTP). A file is divided into segments. A thread downloads segments, one at a time, to the client computer. At any one time, there may be one thread or up to a predetermined number of threads, such as 15, being simultaneously downloaded to the client computer, in order to reduce the time needed to complete the download. Embodiments of the invention optimize the download operation such that the download is successful under all kinds of environmental conditions, such as low bandwidth, memory constrained machines, a faulty network, and the like. In doing so, embodiments of the invention adapt to the environment conditions to maximize the download speed without overloading the client computer.

Embodiments of the invention assess environmental conditions on the client computer, and adjust the download in response to the assessed conditions. Any number of factors that affect the download operations of a system may be monitored. Exemplary embodiments of the invention discuss the monitoring of four parameters. This is purely illustrative and is not meant to limit the implementation of the invention. In an exemplary embodiment, the method monitors four parameters, namely: CPU utilization, memory utilization, bit throughput, and failure rate, and adjusts the number of threads that are simultaneously working to download the bits comprising the file to be downloaded. The bit throughput is the rate at which bits are downloaded through a network onto a computer. For example, if 2 MB of data can be downloaded in one second, the bit throughput is 2 MB per second. The bit rate throughput follows a bell curve, meaning that for a given environment, the throughput can reach a maximum for a given set of parameter values. Embodiments of the invention find the maximum throughput and work to keep the system stable without affecting other parameters that are being monitored by the system, such that the system actively maintains stability. The method acts on the system when the download speed is stable. The action performed, whether it be to increase or decrease the number of threads downloading, is dependent on a current throughput and a last action that was taken. Embodiments of the invention provide a robust mechanism to deliver bits under varying conditions for bandwidth, memory, loads and CPU loads.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
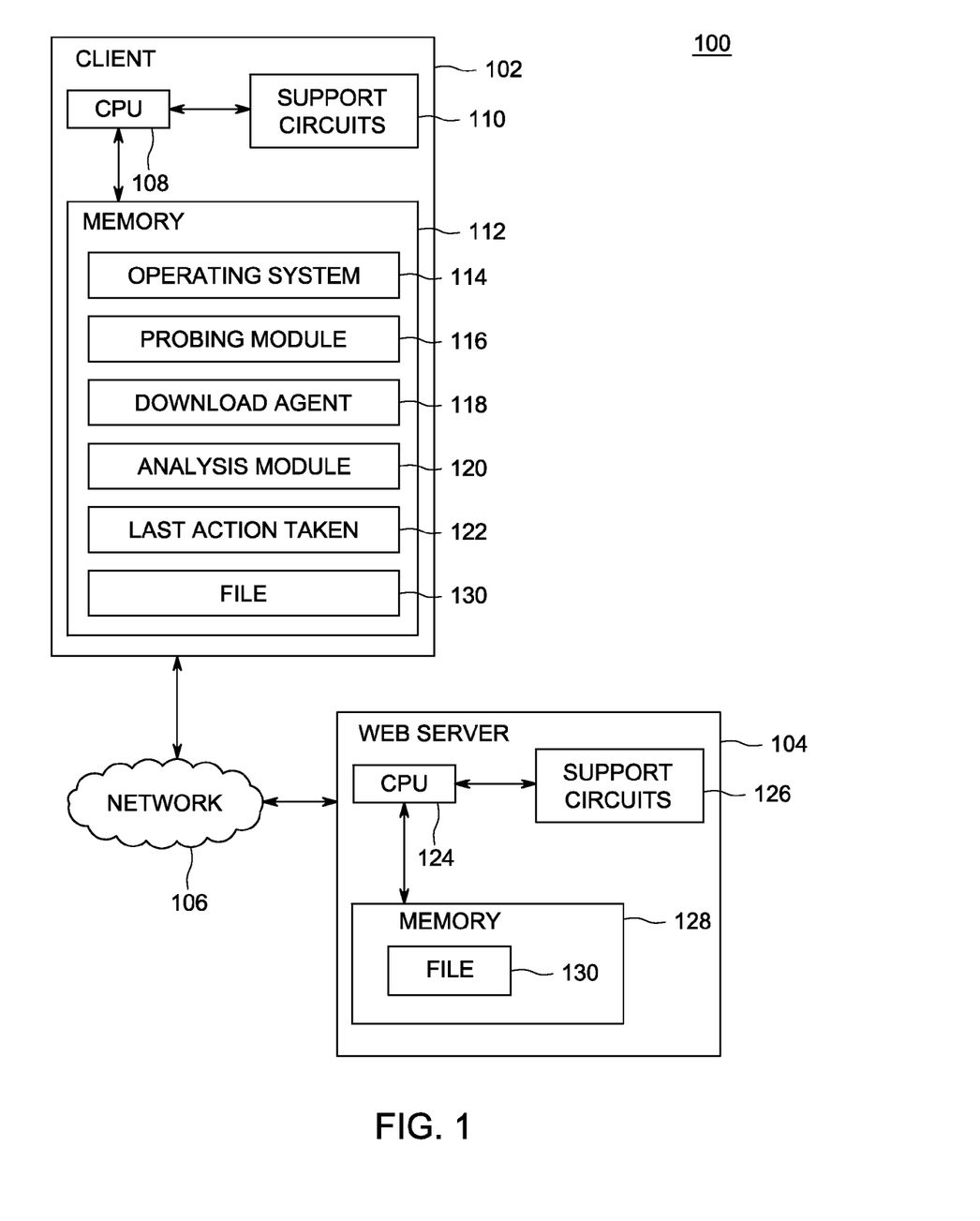
FIG. 1 depicts a block diagram of a system for optimizing download operations, according to one or more embodiments of the invention.

FIG. 1 depicts a block diagram of a system 100 for optimizing download operations, according to one or more embodiments of the invention. The system 100 comprises a client computer 102 and a web server 104 connected to each other through a network 106. The system 100 optimizes the downloading of the bits, i.e. the file 130 from the server 104 onto the client 102 via the download agent 118 and the analysis module 120 utilizing the algorithm defined below.

The client 102 comprises a CPU 108, support circuits 110 and a memory 112. The client 102 is a type of computing device (e.g., a laptop, a desktop, a Personal Digital Assistant (PDA) and/or the like). The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 112 comprises at least one of Read Only Memory (ROM), Random Access Memory (RAM), disk drive storage, optical storage, removable storage and/or the like. The memory 112 comprises an operating system 114, a probing module 116, a download agent 118, an analysis module 120, a last action taken 122, and the file 130. The download agent 118 may be any download processor, such as ADOBE® Application Manager, provided by ADOBE Systems Incorporated, San Jose, Calif., capable of managing file downloads.

According to some embodiments of the invention, the operating system (OS) 114 generally manages various computer resources (e.g., network resources, file processors, and/or the like). The operating system 114 is configured to execute operations on one or more hardware and/or software modules, such as Network Interface Cards (NICs), hard disks, virtualization layers, firewalls and/or the like. Examples of the operating system 114 may include, but are not limited to, Linux, Mac OSX, BSD, UNIX, Microsoft Windows, and the like.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, Wi-Fi, Wi-Max, General Packet Radio Service (GPRS), and the like.

The web server 104 comprises a CPU 124, support circuits 126 and a memory 128. The CPU 124 may comprise one or more commercially available microprocessors or microcontrollers that facilitate data processing and storage. The various support circuits 126 facilitate the operation of the CPU 124 and include one or more clock circuits, power supplies, cache, input/output circuits, displays, and the like. The memory 128 comprises at least one of Read Only Memory (ROM), Random Access Memory (RAM), disk drive storage, optical storage, removable storage and/or the like. The memory 128 comprises a file 130 to be downloaded to the client 102. In some embodiments, the file 130 comprises contents, software applications, updates, and the like. The file 130 is optimally downloaded from the server 104 to the client 102 using the proposed embodiments.

According to some embodiments, the analysis module 120 checks the download speed of the system 100 to determine the speed stability of the system. In some embodiments, the stability of the system 100 is checked before taking the action because for an unstable speed condition, changing the thread count would negatively affect the download. Once the download speed is stable for the current number of download threads, the environment is evaluated.

In some embodiments, the analysis module 120 evaluates various environment parameters, namely: memory usage, CPU usage, failure rate, and bit throughput.

Based on the evaluation of each of the environment parameters in combination with the last action taken 122, the analysis module 120 determines whether the system 100 should be dampened, accelerated, or have no action taken. If the analysis module 120 receives a recommendation that the system 100 needs to be dampened, the agent 118 damps the system 100 by decreasing the number of threads used for the download. If the analysis module 120 receives a recommendation that the system 100 may be accelerated, the agent 118 accelerates the system 100 by increasing the number of threads used for download. The total number of threads used for download may oscillate between 1 and a predefined limit, such as 15.

The probing module 116 creates ripples in the system 100 periodically, for example, when the download speed has been stable for the last ten seconds. During probing, the probing module increases and decreases the threads alternatively. Although in the illustrated embodiment probing module 116 is shown, in one or more embodiments it may be desirable to not include a probing module.

Figure 2:
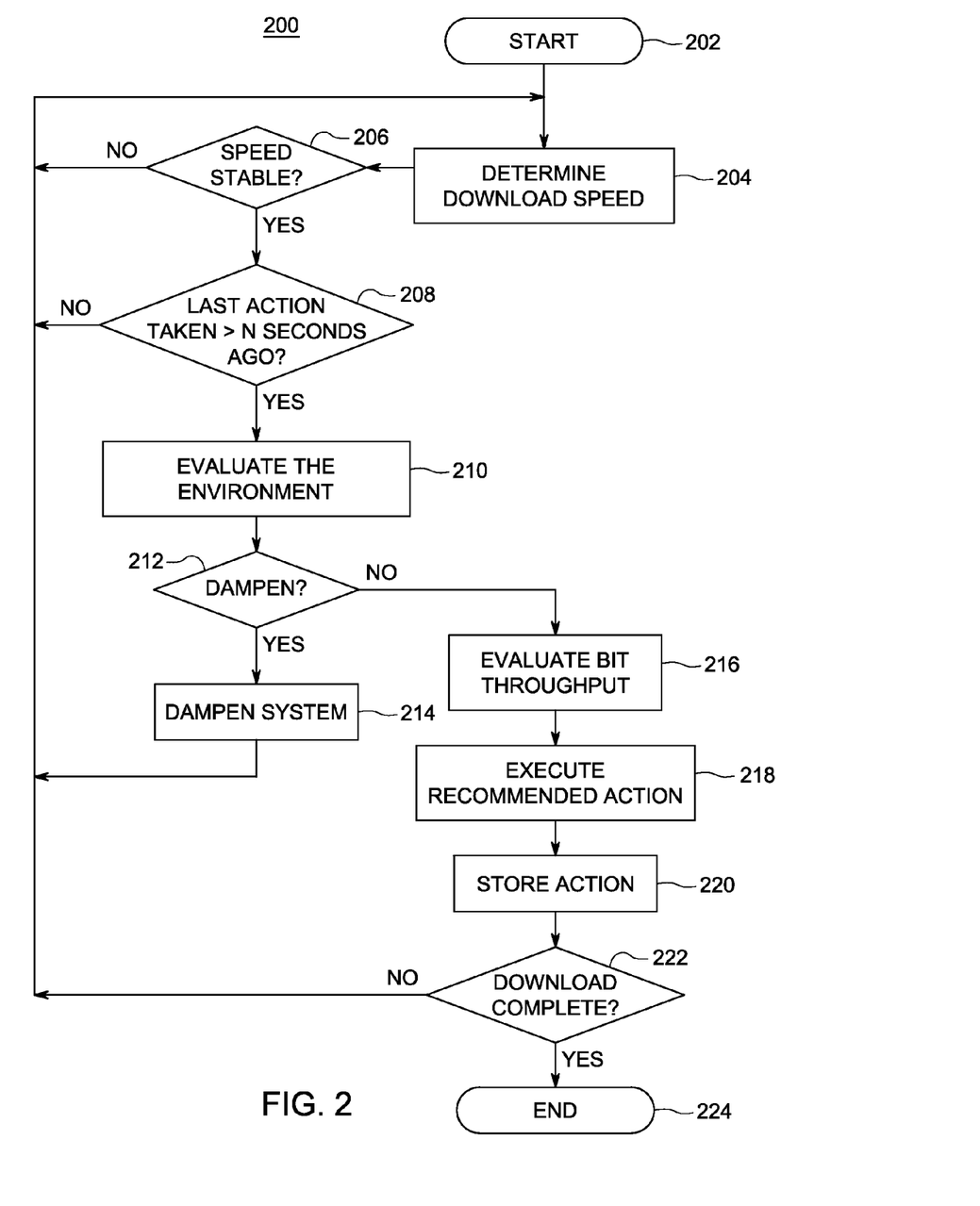
FIG. 2 depicts a flow diagram of a method for optimizing download operations as performed by the system of FIG. 1, according to one or more embodiments of the invention.

FIG. 2 depicts a flow diagram of a method 200 for optimizing download operations as performed by the system 100 of FIG. 1, according to one or more embodiments of the invention. The method 200 evaluates a condition of the system in order to determine the stability of the system. In one embodiment, the method 200 evaluates the stability of the download speed. It is appreciated that although FIG. 2 utilizes the stability of the download speed, other embodiments of the present disclosure envision alternate conditions of the download speed that may be utilized. The method 200 evaluates the environment and takes actions based on the evaluation. The actions include dampening the system, accelerating the system, or leaving the system unchanged. The method 200 determines what action to take based on environmental factors as well as the previous (or last) action taken. The last action will have been to accelerate the system, dampen the system, or leave the system unchanged. The method 200 starts at step 202 and proceeds to step 204.

At step 204, the method 200 determines a download speed. The download speed may be determined via any of various means known to one skilled in the art. For example, an instant download speed is the number of bits downloaded in a predefined period of time, for example, 1 second. The instant download speed is stored in memory with a predefined number of previously determined instant download speeds, for example for a total of eight instant download speeds. The method 200 proceeds to step 206. At step 206, the method 200 determines whether the system is stable. The download speed is determined to be stable when the standard deviation of the last eight instant download speeds is less than a predefined percentage, (e.g., 20%) of the mean of those eight samples. If the method 200 determines the download speed is not stable, the method 200 proceeds to step 204. If at step 206, the method 200 determines the download speed is stable, the method 200 proceeds to step 208. At step 208, the method 200 checks when the last action was taken. The method 200 will not take any action unless a predefined period of time (e.g., N seconds) has passed since a last action was taken, for example, not less than 4 seconds. If the last action was taken within the last N seconds, the method 200 proceeds to step 204. However, if the last action was taken N or more seconds prior, the method 200 proceeds to step 210.

At step 210, the method 200 evaluates the environment. The method 200 evaluates various environment parameters, such as memory usage, CPU usage, and failure rate, as described in further detail with respect to method 300 of FIG. 3 below. The method 300 will return the result of its evaluation of the environment with a recommendation to "dampen" the system, meaning to decrease the number of threads being used for download, or take "no action".

A return value of "no action" will result in further evaluation of the download threads, via steps 216 through 222, to be described later, to determine whether the system should be dampened, accelerated or left unchanged. The method 200 proceeds to step 212.

At step 212, the method 200 evaluates the return value from method 300. If the recommendation is to take no action, the method 200 proceeds to step 216. However, if at step 212, the method 200 determines the recommendation is to dampen the system, the method 200 proceeds to step 214. At step 214, the method 200 dampens the system, meaning the method 200 decreases the number of threads being used for download by one. However, the method 200 will never decrease the number of threads being downloaded below one. In other words, the method 200 will never stop the download. The method 200 then stores the last action taken to "damp" along with the time of the last action taken. The method 200 then proceeds to step 204.

At step 216, the method 200 evaluates the environment based on bit throughput in term of the last action taken, and a download speed divergence level. The download speed divergence level is calculated between two values, namely the current stable download speed (D) and the download speed when the last action was taken (B) with an acceptable tolerance level ($\in$) of, for example, 10%. A divergence level can have three values:

$D > B + \in$ represents positive divergence
$D < B + \in$ represents negative divergence
$|D - B| < \in$ represents acceptable divergence The method 200 retrieves the last action taken and evaluates the action in relation to the divergence level. Table 1 contains the action to be taken based on the current download speed. In Table 1, in terms of actions taken (or to be taken) (+) represents "accelerate" the system, meaning add an additional thread for download, (−) represents "dampen" the system, meaning decrease the number of threads for download by one, and $\emptyset$ represents no action taken. In terms of download speed divergence, (+) represents positive divergence, (−) represents negative divergence, and $\emptyset$ represents acceptable divergence.

TABLE 1

| Last Action Taken | Download Speed Divergence | Recommended action to be taken |
|---|---|---|
| + | + | + |
| + | − | − |
| + | $\emptyset$ | $\emptyset$ |
| − | + | − |
| − | − | + |
| − | $\emptyset$ | − |
| $\emptyset$ | + | + |
| $\emptyset$ | − | − |
| $\emptyset$ | $\emptyset$ | $\emptyset$ |

As shown in Table 1, when the last action taken was to "accelerate" the system, meaning to add a thread to the download, and the download speed divergence is positive, the method 200 recommends the action "accelerate". The method 200 proceeds to step 218. At step 218, the method 200 executes the action recommended in step 216. If the recommendation is to accelerate the system, the method 200 adds an additional thread to the number of threads of bits being downloaded. If the recommendation is to dampen the system, the method 200 decreases the number of threads being used for download. If the recommendation is to take no action, the method 200 takes no action on the system. The method 200 proceeds to step 220.

At step 220, the method 200 stores the recommended action as the last action taken. The method 200 proceeds to step 222. At step 222, the method 200 determines whether the download is complete. If the method 200 determines that the download is not complete, the method 200 proceeds to step 204. However, if the method 200 determines the download is complete, the method 200 proceeds to step 224 and ends.

Figure 3:
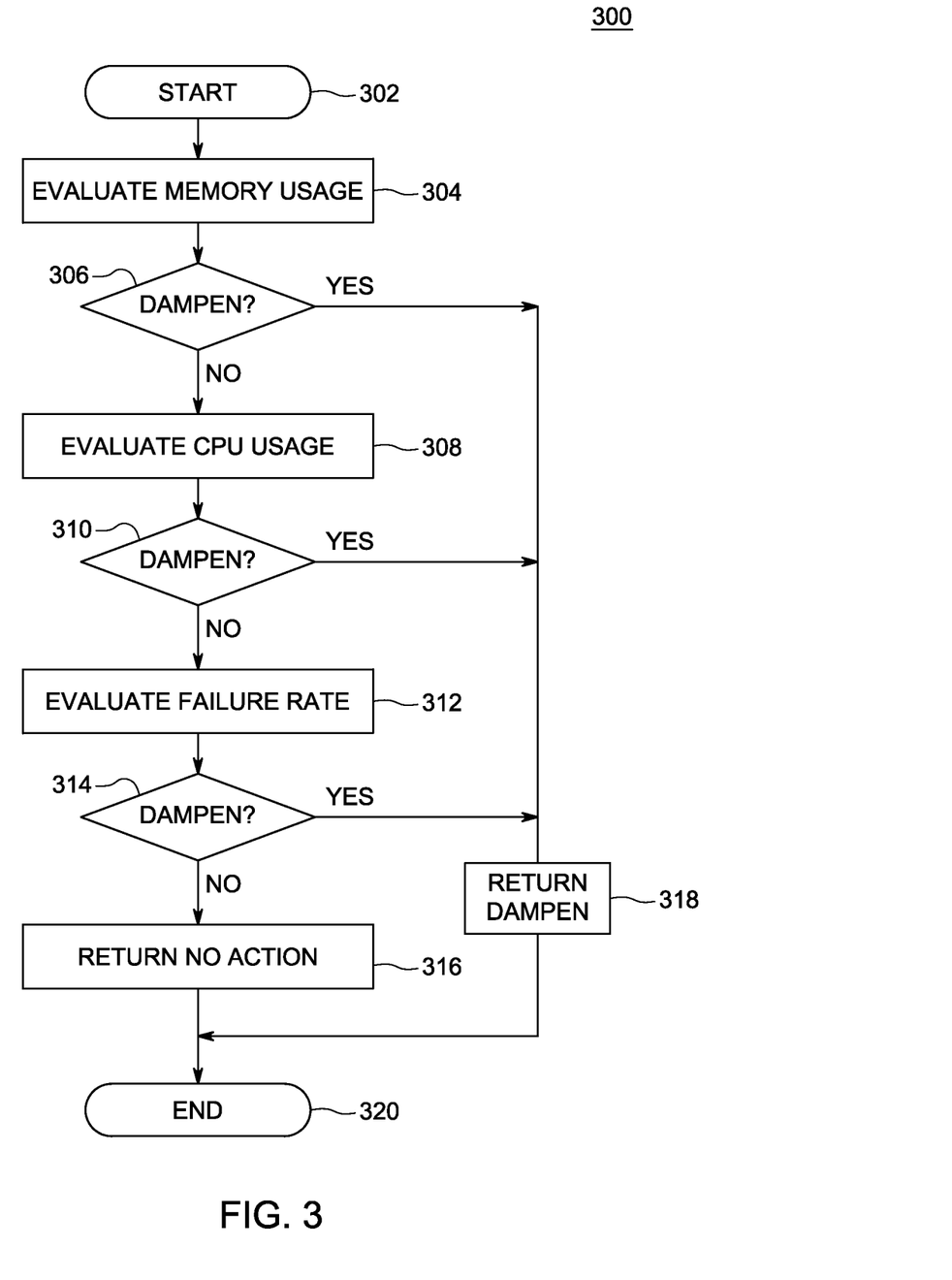
FIG. 3 depicts a flow diagram of a method for evaluating the environment as performed by the analysis module of FIG. 1, according to one or more embodiments of the invention.

FIG. 3 depicts a flow diagram of a method 300 for evaluating the environment, as performed by step 210 of FIG. 2, according to one or more embodiments of the invention.

The method 300 starts at step 302, and proceeds to step 304. At step 304, the method 300 evaluates the memory usage of the system. The method 300 calculates the percentage of the memory consumed by the download with respect to the available memory on the system. The method 300 proceeds to step 306, where the method 300 determines whether the memory used for the download is more than a predefined percentage, for example, 50% of the available memory or if the memory consumed is more than a predefined threshold, for example, 500 MB. If the method 300 determines that the predefined thresholds have been exceeded, the method 300 recommends the action "dampen", meaning reduce the number of download threads by one and proceeds to step 318. However, if the method 300 determines that memory used for the download is not more than the predefined percentage, for example, 50% of the available memory and the memory consumed is less than or equal to the predefined threshold, for example, 500 MB, the method 300 and proceeds to step 308.

At step 308, the method 300 evaluates CPU usage. The method 300 calculates the percentage of CPU utilized by the download with respect to the total CPU available. The method 300 proceeds to step 310, where the method 300 determines whether the CPU usage used for the download is greater than a predefined percentage, for example, 20%. If the method 300 determines that the CPU usage is greater than the predefined percentage, for example, 20%, then the method 300 recommends the action "dampen", meaning reduce the number of download threads by one and proceeds to step 318. However, if the method 300 determines that the CPU usage for the download is not greater than the predefined percentage, for example, 20% of the available CPU, the method 300 proceeds to step 312.

At step 312, the method 300 evaluates the failure rate of a plurality of HTTP connections that are continuously spawned by the threads. Failure rate signifies how much the system or server is overloaded with multiple connections. The method 300 proceeds to step 314, where the method 300 determines whether the failure rate is more than a predefined percentage, for example, 50%. If the method 300 determines that the predefined percentage has been exceeded, the method 300 recommends the action "dampen", meaning reduce the number of download threads by one and proceeds to step 318. However, if the method 300 determines that the failure rate for the connections is not greater than the predefined percentage, for example, 50%, the method 300 recommends "no action" and proceeds to step 316.

At step 316, the method 300 returns the recommendation to "take no action". The method 300 proceeds to step 320. At step 318, the method 300 returns the recommendation to "dampen" the system. The method 300 proceeds to step 320 and ends.

Figure 4:
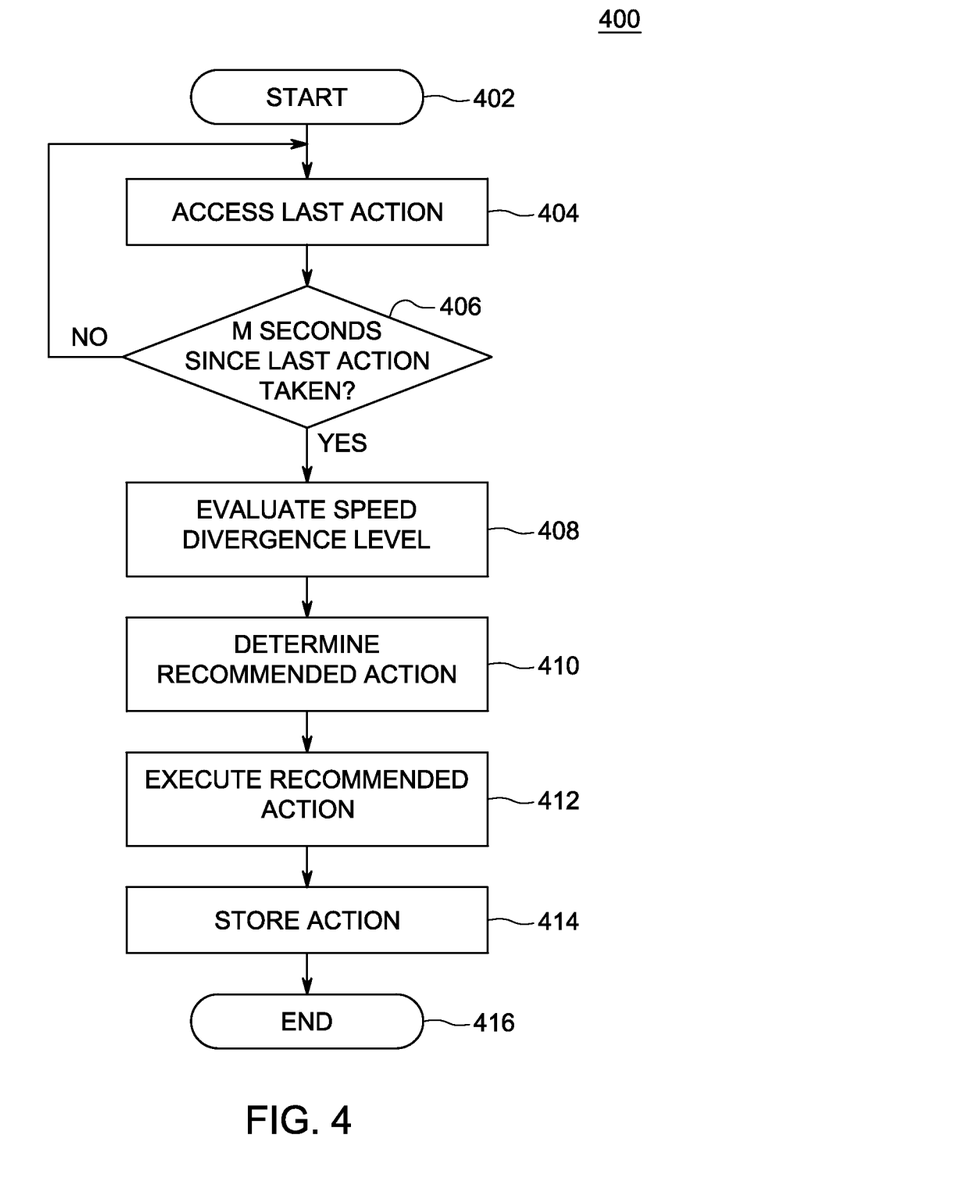
FIG. 4 depicts a flow diagram of a method for probing the system as performed by the probing module of FIG. 1, according to one or more embodiments of the invention.

FIG. 4 depicts a flow diagram of a method 400 for probing the system as performed by the probing module 116 of FIG. 1, according to one or more embodiments of the invention. The method 400 executes in parallel to method 200 above. When the download system is going through an equal speed divergence level and no action was taken for the last, for example, M seconds e.g., 10 seconds, the method 400 probes the system in order to create ripples in the system. This ripple is necessary in embodiments were one wishes to detect an unfetched bandwidth or redundant download threads. The ripple will alternately accelerate or dampen the system. After a ripple is generated, the download system will again adapt itself and converge to the most optimized state through the continued execution of method 200.

The method 400 starts at step 402, and proceeds to step 404. At step 404, the method 400 accesses the last action taken to determine the time of the last action. The method 400 proceeds to step 406. At step 406, the method 400 determines whether M seconds have lapsed since the last action was taken on the system. If the method 400 determines that there has been an action taken in the last M seconds, the method 400 proceeds to step 404. If the method 400 determines that no action has been taken on the system in the previous M seconds, the method 400 proceeds to step 408. At step 408, the method 400 evaluates the speed divergence level as described in step 216 in method 200 above. The method 400 proceeds to step 410.

At step 410, the method 400 determines the recommended action based on the previous probe action and the speed divergence level. Table 2 shows what action is to be taken. Table 2, in terms of last probe action taken (++) represents the last probe "accelerated" the system, and (−−) represents the last probe "dampened" the system, meaning the probe decreased the number of threads for download by one. In terms of download speed divergence, (+) represents positive divergence, (−) represents negative divergence, and Ø represents acceptable divergence. In terms of action to be taken (+) represents "accelerate" the system meaning add an additional thread for download, and (−) represents "dampen" the system, meaning decrease the number of threads for download by one.

TABLE 2

| Last Probe Action Taken | Download Speed Divergence | Recommended action to be taken |
| --- | --- | --- |
| ++ | + | + |
| ++ | − | − |
| ++ | Ø | − |
| −− | + | − |
| −− | − | + |
| −− | Ø | − |

The method 400 proceeds to step 412. At step 412, the method 400 executes the action recommended in step 410 above. If the recommendation is to accelerate the system, the method 400 adds an additional thread to the number of threads being used for downloaded. If the recommendation is to dampen the system, the method 400 decreases the number of threads being used for download. The recommended action, whether the action is to accelerate or dampen the system, creates a 'ripple' in the stable system. Because the method 400 runs in parallel to method 200, the method 200 continues to evaluate the stability of the system and take action as described above, causing the system to converge to a most optimized state after the ripple. The method 400 proceeds to step 414.

At step 414, the method 400 stores the probe action taken. The method 400 proceeds to step 416 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
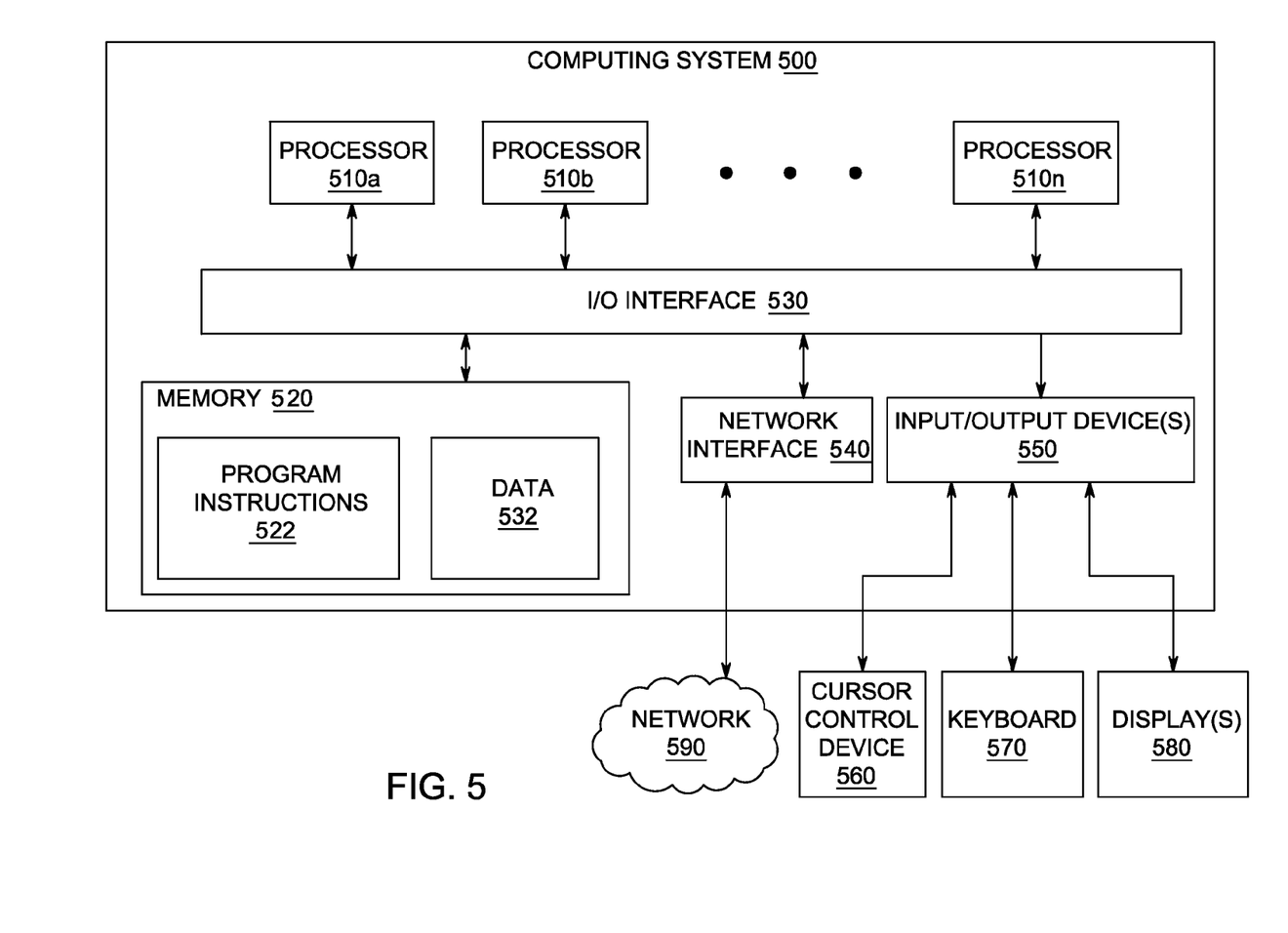
FIG. 5 depicts a computer system that can be utilized in various embodiments of the present invention, according to one or more embodiments of the invention.

FIG. 5 depicts a computer system that can be used to implement the methods of FIGS. 2-4 in various embodiments of the present invention, according to one or more embodiments of the invention. FIG. 5 depicts a computer system that can be utilized in various embodiments of the present invention to implement the computers 102 and 104, according to one or more embodiments.

Various embodiments of method and apparatus for optimizing download operations, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200, 300 and 400, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for optimizing downloading operations comprising:
monitoring, by at least one processor of a computer, a download speed for a plurality of threads for a file to the computer from a web server, wherein each thread of the plurality of threads is used to download a portion of the file;
determining, by the at least one processor, a standard deviation of a plurality of previous download speeds for threads of the plurality of threads;
evaluating a plurality of environmental factors of the computer by comparing one or more of a CPU usage of the computer being used to download the plurality of threads with a total available CPU capacity or a memory usage of the computer being used to download the plurality of threads with a total available memory of the computer; and based on the evaluation of the plurality of environmental factors of the computer and when the standard deviation of the plurality of previous download speeds is determined to be less than a predefined threshold, performing, by the at least one processor of the computer, one of increasing or decreasing a number of threads of the plurality of threads simultaneously being used to perform a download from the web server.

2. The method of claim 1, further comprising performing, by the at least one processor of the computer, one of increasing or decreasing the number of threads of the plurality of threads simultaneously being used to perform the download from the web server based on at least one other factor.

3. The method of claim 2, further comprising:
evaluating a bit throughput of the plurality of threads on the computer, wherein the at least one other factor is the bit throughput of the plurality of threads.

4. The method of claim 2, wherein the at least one factor comprises an HTTP connection failure rate of the computer.

5. The method of claim 1, wherein the predefined threshold is a percentage of a mean of the plurality of previous download speeds.

6. The method of claim 1, further comprising performing, by the at least one processor of the computer, one of increasing or decreasing the number of the plurality of threads simultaneously being used to perform the download only if a predefined period of time has passed since previously increasing or decreasing the number of the plurality of threads simultaneously being used to perform the download.

7. The method of claim 6, wherein performing, by the at least one processor of the computer, one of increasing or decreasing the number of the plurality of threads simultaneously being used to perform the download from the web server is further based on a determined stability of the computer.

8. An apparatus for optimizing downloading operations comprising:
a processor, and
a memory having stored therein instructions, executable by the processor, to determine download speed stability for a plurality of threads for a file to a computer, wherein each thread of the plurality of threads is used to download a portion of the file, by causing the apparatus to:
determine a standard deviation of a plurality of previous download speeds for threads of the plurality of threads;
determine a download speed to be stable when the standard deviation of the plurality of previous download speeds is determined to be less than a predefined threshold;
evaluate a plurality of factors on the computer by comparing one or more of a CPU usage of the computer being used to download the plurality of threads with a total available CPU capacity or a memory usage of the computer being used to download the plurality of threads with a total available memory of the computer; and
vary a number of threads of the plurality of threads simultaneously being used for downloading bits from a server to the computer based on the determined download speed stability, and the evaluated plurality of factors on the computer.

9. The apparatus of claim 8, wherein the memory further contains instructions, executable by the processor, to cause the apparatus to deliberately increase or decrease the number of threads simultaneously being used for downloading the bits if the standard deviation of the plurality of previous download speeds is determined to be less than the predefined threshold.

10. The apparatus of claim 8, wherein the plurality of factors comprise an HTTP connection failure rate of the computer.

11. The apparatus of claim 8, wherein the memory further contains instructions, executable by the processor, to cause the apparatus to recommend at least one of dampening action, accelerating action or inaction based on a determination of download speed stability.

12. The apparatus of claim 11, wherein the at least one dampening action comprises decreasing the number of threads for download.

13. The apparatus of claim 11, wherein the memory further contains instructions, executable by the processor, to cause the computer to increase or decrease the number of the plurality of threads simultaneously being used for downloading the bits only if a predefined period of time has passed since previously increasing or decreasing the number of the plurality of threads simultaneously being used for downloading the bits.

14. The apparatus of claim 8, wherein the memory further contains instructions, executable by the processor, to cause the apparatus to:
calculate a divergence level between a current stable download speed and a previous download speed when a last action of increasing or decreasing a number of threads simultaneously being used to download was performed; and
vary the number of threads of the plurality of threads simultaneously being used for downloading bits from a server to the computer based on the calculated divergence level.

15. A non-transitory computer readable medium for storing computer instructions that, when executed by at least one processor cause a computer to perform a method of downloading files comprising:
initiating a download of a file to the computer by simultaneously downloading a number of threads of a plurality of threads, wherein each thread of the plurality of threads is used to download a portion of the file;
determining a standard deviation of download speeds for the number of threads of the plurality of threads;
evaluating a plurality of environmental factors on the computer, wherein evaluating is only performed when the standard deviation of the download speeds for the number of threads meets a condition, and wherein evaluating the plurality of environmental factors on the computer comprises comparing one or more of a CPU usage of the computer being used to download the plurality of threads with a total available CPU capacity or a memory usage of the computer being used to download the plurality of threads with a total available memory of the computer; and
depending on the evaluated plurality of environmental factors, increasing or decreasing, by the computer, the number of the plurality of threads simultaneously being used to download the file to the computer.

16. The computer readable medium of claim 15, wherein the method further comprises calculating a divergence level between a current stable download speed and a previous download speed when a last action of increasing or decreasing the number of threads simultaneously being used to download was performed.

17. The computer readable medium of claim 15, wherein the method further comprises:
evaluating a bit throughput of the threads on the computer; and executing a recommended action based on the evaluated bit throughput and a previous recommended action, wherein the recommended action is one of increasing, decreasing, and not changing the number of threads.

18. The computer readable medium of claim 15, wherein increasing or decreasing, by the computer, the number of the plurality of threads simultaneously being used to download the file to the computer is only performed if a predefined period of time has passed since previously performing one of increasing or decreasing the number of threads simultaneously being used to download the file to the computer.

19. The computer readable medium of claim 16, wherein the condition is that the standard deviation of the plurality of previous download speeds for threads of the plurality of threads is less than 20% of a mean of the plurality of previous download speeds.

20. The computer readable medium of claim 15, wherein the method further comprises probing the computer when there has been no recommended action for a predefined number of seconds, wherein the probing comprises deliberately dampening or accelerating the computer based on a determined stability of the computer.

* * * * *